US012759052B2

(12) United States Patent
Narita et al.

(10) Patent No.: US 12,759,052 B2
(45) Date of Patent: Oct. 13, 2026

(54) THREE-DIMENSIONAL ADDITIVE MANUFACTURING DEVICE

(71) Applicant: MITSUBISHI HEAVY INDUSTRIES, LTD., Tokyo (JP)

(72) Inventors: Ryuichi Narita, Tokyo (JP); Takayuki Moritake, Tokyo (JP); Akemi Takano, Tokyo (JP); Toshiya Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 421 days.

(21) Appl. No.: 18/563,047

(22) PCT Filed: Jun. 27, 2022

(86) PCT No.: PCT/JP2022/025616

§ 371 (c)(1),
(2) Date: Nov. 21, 2023

(87) PCT Pub. No.: WO2023/286585

PCT Pub. Date: Jan. 19, 2023

(65) Prior Publication Data

US 2024/0261865 A1 Aug. 8, 2024

(30) Foreign Application Priority Data

Jul. 16, 2021 (JP) ................................ 2021-118162

(51) Int. Cl.
*B22F 12/90* (2021.01)
*B22F 10/28* (2021.01)
(Continued)

(52) U.S. Cl.
CPC .............. *B22F 12/90* (2021.01); *B22F 10/28* (2021.01); *B22F 12/49* (2021.01); *B33Y 30/00* (2014.12)

(58) Field of Classification Search
None
See application file for complete search history.

(56) References Cited

U.S. PATENT DOCUMENTS

2015/0165683 A1 6/2015 Cheverton et al.
2019/0299527 A1 10/2019 Kitamura et al.
2019/0375010 A1* 12/2019 Richardson ............ B33Y 30/00

FOREIGN PATENT DOCUMENTS

JP 2009-001900 A 1/2009
JP 2019-173103 A 10/2019
(Continued)

OTHER PUBLICATIONS

International Search Report issued in corresponding International Application No. PCT/JP2022/025616 mailed Aug. 30, 2022 (8 pages).
(Continued)

*Primary Examiner* — Yung-Sheng M Tsui
(74) *Attorney, Agent, or Firm* — Osha Bergman Watanabe & Burton LLP

(57) ABSTRACT

A three-dimensional additive manufacturing device, which performs additive manufacturing by irradiating, with a beam, a powder bed laid on a build surface area, includes a projection unit that is configured to project a pattern in which there is a luminance distribution in the build surface area and the luminance distribution changes over time, an imaging unit configured to image the pattern projected onto the build surface area, and a reflective part configured to reflect at least one among a first light beam projected by the projection unit and a second light beam captured by the imaging unit. The projection and imaging units are disposed outside the chamber where the additive manufacturing is performed on the build surface area. The reflective part is accommodated inside the chamber. The first and second
(Continued)

light beams pass through one first window portion installed on the chamber.

14 Claims, 10 Drawing Sheets

(51) Int. Cl.
*B22F 12/49* (2021.01)
*B33Y 30/00* (2015.01)

(56) References Cited

FOREIGN PATENT DOCUMENTS

| | | | |
|---|---|---|---|
| JP | 2020-514557 | A | 5/2020 |
| JP | 2020-125509 | A | 8/2020 |
| WO | 2018/172089 | A1 | 9/2018 |

OTHER PUBLICATIONS

International Preliminary Report on Patentability issued in corresponding International Application No. PCT/JP2022/025616 mailed Jan. 25, 2024 (10 pages).

* cited by examiner

THREE-DIMENSIONAL ADDITIVE MANUFACTURING DEVICE

TECHNICAL FIELD

The present disclosure relates to a three-dimensional additive manufacturing device.

The present application claims priority based on Japanese Patent Application No. 2021-118162 filed in Japan on Jul. 16, 2021, the contents of which are incorporated herein by reference.

BACKGROUND ART

A three-dimensional additive manufacturing technique is known in which additive manufacturing is performed by irradiating powders laid in a layered state with a beam such as a light beam or an electron beam to produce a three-dimensional object. PTL 1 discloses an example of this type of technique, in which a powder layer made of powder is irradiated with a light beam to form a sintered layer and a plurality of sintered layers, which are formed by repetition of the sintered layer formation, are laminated as one body to produce a three-dimensional object.

CITATION LIST

Patent Literatures

[PTL 1] Japanese Unexamined Patent Application Publication No. 2009-1900

[PTL 2] Japanese Unexamined Patent Application Publication No. 2019-173103

SUMMARY OF INVENTION

Technical Problem

In the three-dimensional additive manufacturing method as in PTL 1 above, the layered sintered layers are repeatedly laminated to form a large three-dimensional object. Thus, a long work time is required to complete the three-dimensional additive manufacturing method. In particular, in a case where a powder of metal such as iron, copper, aluminum, or titanium is used, the work time thereof is actually several tens of hours.

Further, since a manufacturing process implemented by this type of three-dimensional additive manufacturing method is a thermal process, an abnormality may occur on a laying surface or a build surface of the powder during the manufacturing. For example, in a case where the build surface is deformed to protrude upward, undulation occurs on the laying surface of the powder laid on the build surface. Further, in a case where spatter occurs during the manufacturing, the spatter may remain as a foreign substance in a manufactured object. These abnormalities may occur while a manufacturing work is in progress.

In order to detect these abnormalities while the manufacturing work is in progress, a three-dimensional additive manufacturing device as in PTL 2 detects, based on image data acquired by capturing a fringe pattern represented by a continuous sinusoidal illuminance distribution projected on a build surface area, undulation in the build surface area.

However, in a case where a projection part or an imaging part that detects the undulation is accommodated in a chamber of the three-dimensional additive manufacturing device, a flow of an airflow introduced into the chamber to ensure the manufacturing quality may be disturbed. Therefore, the projection part or the imaging part that detects the undulation is desirably disposed outside the chamber.

In a case where the projection part or the imaging part is disposed outside the chamber, it is conceivable that the projection part or the imaging part is disposed above the chamber where an installation space is relatively easily ensured. In this case, a ceiling portion of the chamber is provided with a window portion for incidence and emission of a light beam emitted from the projection part or a light beam emitted from the build surface area for capturing an image with the imaging part.

However, in a recent three-dimensional additive manufacturing device, for example, in order to shorten a manufacturing time, a plurality of beam irradiation devices may be provided and the beam may be emitted from each irradiation device. In such a case, since the beam irradiation is performed through a different window portion for each irradiation device, it is difficult in terms of space to provide the window portion for each of the projection part and the imaging part on the ceiling portion of the chamber. Therefore, the incidence and emission of the emitted light beam and the light beam emitted from the build surface area for capturing an image with the imaging part are desirably performed through one window portion.

However, in this case, an angle formed by an optical axis of the light beam emitted from the projection part and an optical axis of the light beam emitted from the build surface area for capturing an image with the imaging part is relatively small. Therefore, it becomes difficult to ensure detection accuracy of the undulation with the capturing of the fringe pattern.

At least one embodiment of the present disclosure is made in view of the above circumstances, and an object thereof is to ensure detection accuracy of undulation in a built surface area in a three-dimensional additive manufacturing device.

Solution to Problem (1) According to at least one embodiment of the present disclosure, a three-dimensional additive manufacturing device is a three-dimensional additive manufacturing device that irradiates a powder bed laid in a build surface area with a beam to perform additive manufacturing, the three-dimensional additive manufacturing device including a projection part that is configured to project a pattern in which there is a luminance distribution in the build surface area and the luminance distribution changes over time, an imaging part that is configured to image the pattern projected on the build surface area, and a reflective part that is configured to reflect at least any one of a first light beam projected by the projection part or a second light beam captured by the imaging part, in which the projection part and the imaging part are disposed outside a chamber in which the additive manufacturing is performed on the build surface area, the reflective part is accommodated in the chamber, and the first light beam and the second light beam are able to pass through one first window portion installed in the chamber.

Advantageous Effects of Invention

According to at least one embodiment of the present disclosure, it is possible to ensure the detection accuracy of the undulation in the built surface area in the three-dimensional additive manufacturing device.

DESCRIPTION OF EMBODIMENTS

Figure 1:
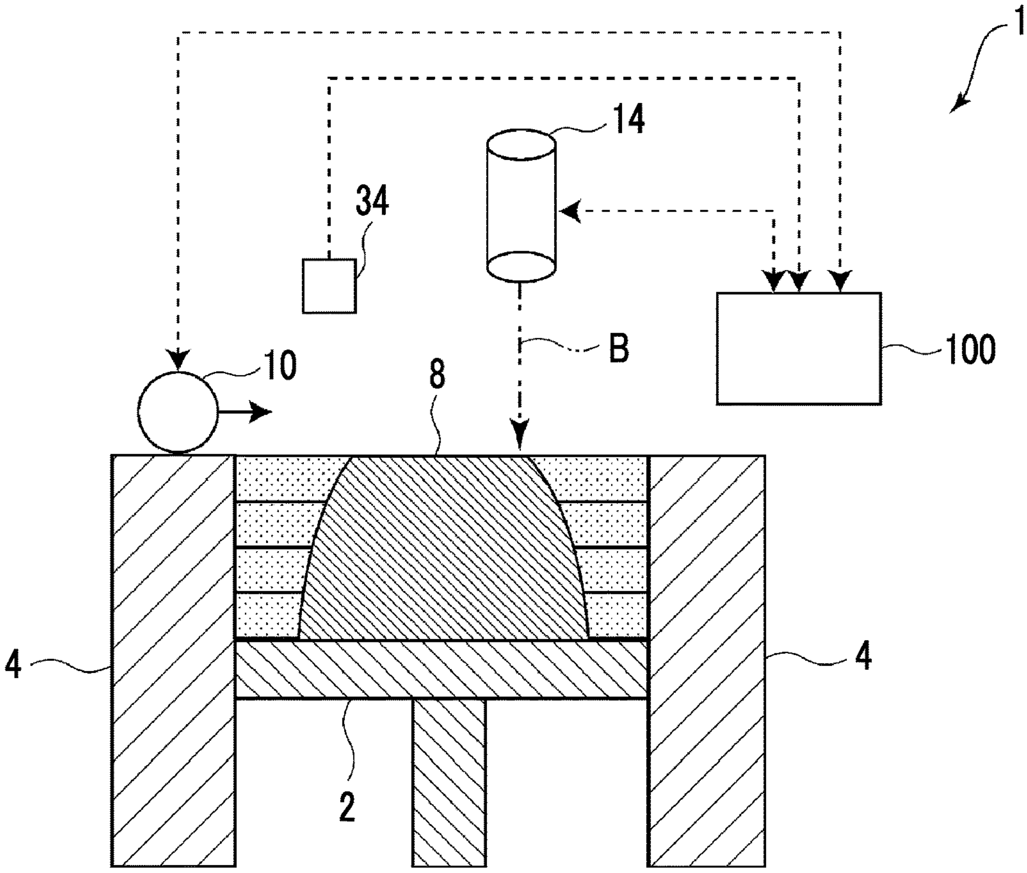
FIG. 1 is a schematic diagram showing an overall configuration of a three-dimensional additive manufacturing device according to at least one embodiment of the present disclosure.

Hereinafter, some embodiments of the present disclosure will be described with reference to the accompanying drawings. However, dimensions, materials, shapes, relative dispositions, and the like of components, which are described as the embodiments or shown in the drawings, are not intended to limit the scope of the present disclosure and are merely explanatory examples.

For example, expressions such as "in a certain direction", "along a certain direction", "parallel", "orthogonal", "center", and "concentric" or "coaxial", which represent relative or absolute dispositions, not only strictly represent such a disposition but also represent a state of relative displacement with a tolerance or at an angle or distance to the extent that the same function can be obtained.

For example, expressions such as "identical", "equal", and "homogeneous", which represent that things are in an equal state, not only strictly represent the equal state but also represent a state where a tolerance or a difference to the extent that the same function can be obtained is present.

For example, an expression representing a shape such as a quadrangular shape or a cylindrical shape not only represents a shape such as a quadrangular shape or a cylindrical shape in a geometrically strict sense but also represents a shape including an undulating portion, a chamfering portion, or the like within a range where the same effect can be obtained.

On the other hand, the expressions "being provided with", "comprising", "including", or "having" one component are not exclusive expressions excluding the presence of other components.

Hereinafter, some embodiments of the present disclosure will be described with reference to the accompanying drawings.

FIG. 1 is a schematic diagram showing an overall configuration of a three-dimensional additive manufacturing device 1 according to at least one embodiment of the present disclosure.

The three-dimensional additive manufacturing device 1 is a device that performs additive manufacturing by irradiating, with a beam, powders laid in a layered state to produce a three-dimensional object. The three-dimensional additive manufacturing device 1 is provided with a base plate 2 serving as a base on which the three-dimensional object is built. The base plate 2 is disposed to be able to move up and down on an inner side of a substantially cylindrical cylinder 4 having a central axis along a vertical direction. A powder bed 8 is formed by powder laying on the base plate 2 as described below. The powder bed 8 is newly formed by the powder laying on an upper layer side each time the base plate 2 moves down in each cycle during a manufacturing work.

A case where a light beam is emitted as a beam B is shown in the three-dimensional additive manufacturing device 1 of the present embodiment. However, even in a case where another form of the beam B such as an electron beam is used, the concept of the present disclosure is also applicable.

The three-dimensional additive manufacturing device 1 is provided with a powder laying unit 10 that performs the power laying on the base plate 2 to form the powder bed 8. The powder laying unit 10 supplies the powder to an upper surface side of the base plate 2 and flattens a surface thereof to form a layered powder bed 8 having a substantially uniform thickness over the entire upper surface of the base plate 2. Solidification is selectively performed by the beam B emitted from a beam irradiation unit 14 described below, and in the next cycle, the powder is again laid on the upper layer side by the powder laying unit 10 to form a new powder bed on the powder bed 8 formed in each cycle. With repetition of this process, the powders are laminated in a layered state.

The powder supplied from the powder laying unit 10 is a powdery substance that is a raw material for the three-dimensional object, and can widely employ, for example, a metallic material such as iron, copper, aluminum, or titanium, or a non-metallic material such as ceramic.

Figure 2:
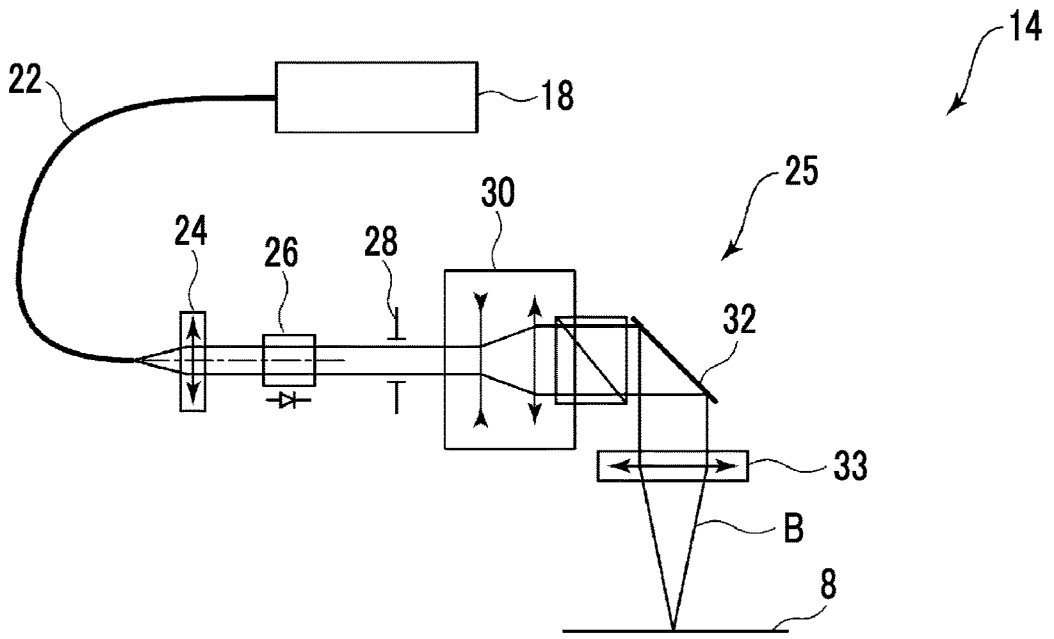
FIG. 2 is a schematic diagram showing an internal configuration of a beam irradiation unit of FIG. 1.

The three-dimensional additive manufacturing device 1 is provided with the beam irradiation unit 14 which is an irradiation part that irradiates the powder bed 8 with the beam B to selectively solidify the powder bed 8. FIG. 2 is a schematic diagram showing an internal configuration of the beam irradiation unit 14 of FIG. 1. The beam irradiation unit 14 is provided with a light source 18 that outputs laser light as the beam B, an optical fiber 22 for guiding the beam B from the light source 18 to a light condensing part 25, and the light condensing part 25 composed of a plurality of optical devices.

In the light condensing part 25, the beam B guided by the optical fiber 22 is incident on a collimator 24. The collimator 24 focuses the beam B on parallel light. Light emitted from the collimator 24 is incident on a beam expander 30 via an isolator 26 and a pinhole 28. After a diameter of the beam B is expanded by the beam expander 30, the beam B is deflected by a galvanometer mirror 32 capable of swinging in a predetermined direction, and is emitted to the powder bed 8 via a fθ lens 33.

The beam irradiation from the galvanometer mirror 32 to the powder bed 8 may be performed without passing through the fθ lens 33.

The beam B emitted from the beam irradiation unit 14 is two-dimensionally scanned, on the powder bed 8, along a surface thereof. Such two-dimensional scanning of the beam B is implemented in a pattern corresponding to the three-dimensional object to be built, and specifically, is performed by drive control of an angle of the galvanometer mirror 32.

For example, the two-dimensional scanning of the beam B may be performed by a drive mechanism (not shown) causing the beam irradiation unit 14 to move in parallel along the surface of the base plate 2, or may be performed in combination with the drive control of the angle of the galvanometer mirror 32 described above.

In the three-dimensional additive manufacturing device 1 having such a configuration, the powder is laid on the base plate 2 by the powder laying unit 10 to form the powder bed 8 in each cycle, based on a control signal from a control device 100 (for example, calculation processing device such as a computer) which is a control unit, and the two-dimensional scanning is performed while irradiating the powder bed 8 with the beam B from the beam irradiation unit 14 to selectively solidify the powder included in the powder bed 8. In the manufacturing work, with repeated implementation of such a cycle, the solidified forming layers are laminated, and the target three-dimensional object is produced.

Returning to FIG. 1 again, the three-dimensional additive manufacturing device 1 is provided with a shape measurement device 34 that monitors a shape of the powder bed 8 or a build surface (surface irradiated with the beam B) during the manufacturing work. In the present embodiment, an optical scanner based on a fringe projection method is used as an example of the shape measurement device 34.

Figure 3:
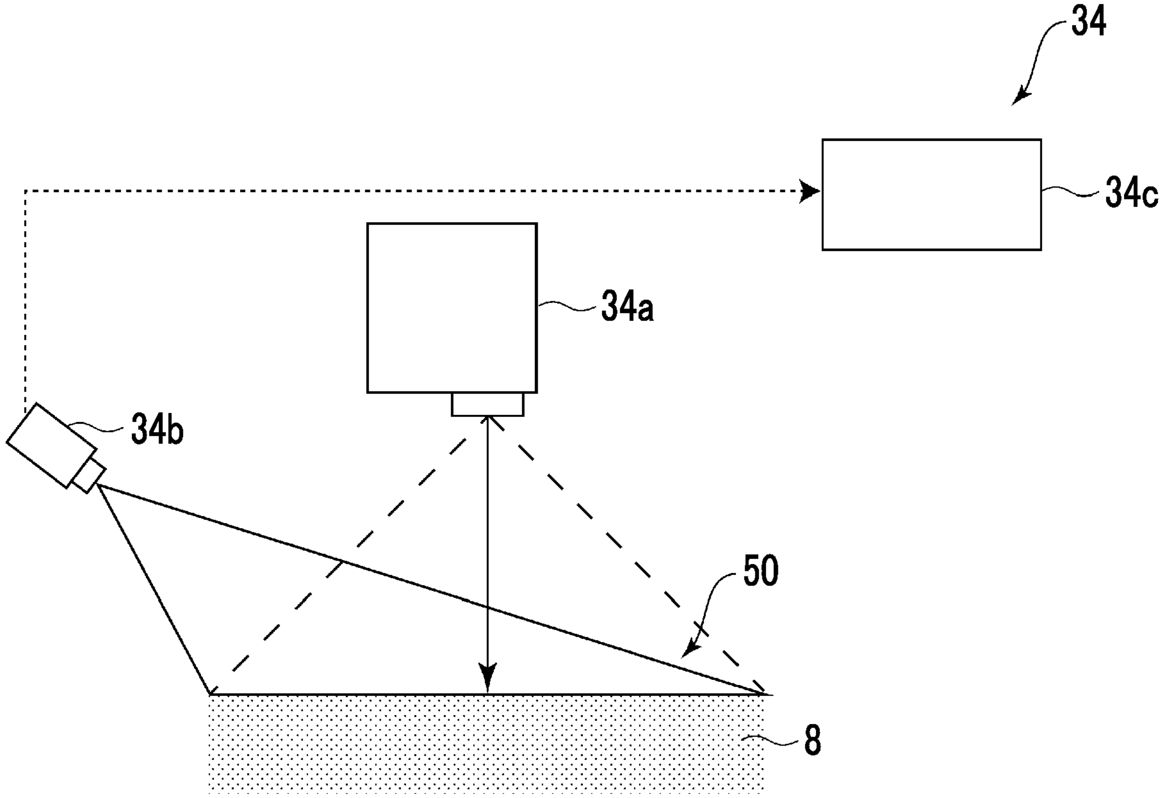
FIG. 3 is a schematic configuration diagram of a shape measurement device of FIG. 1.

FIG. 3 is a schematic configuration diagram of the shape measurement device 34 of FIG. 1. In FIG. 3, the description of a reflective part 36, which will be described below, is omitted. The shape measurement device 34 is provided with a projection part 34*a* that is a projector configured to project a fringe pattern (striped pattern having a continuous sinusoidal intensity distribution) onto a build surface area (powder bed 8 or build surface) 50 on the base plate 2, an imaging part 34*b* that is configured to image the fringe pattern projected on the build surface area 50, and an undulation detection part 34*c* that is configured to detect an undulation in the build surface area 50 based on image data acquired by the imaging part 34*b*.

The pattern projected by the projection part 34*a* is, for example, the fringe pattern as described above, and is a pattern in which there is a luminance distribution in the build surface area 50 and the luminance distribution changes over time. However, the pattern projected by the projection part 34*a* may be a pattern other than the fringe pattern as long as the pattern is employed in which there is the luminance distribution in the build surface area 50 and the luminance distribution, which is known as a function of an azimuth angle from a reference axis of the projector, changes over time in a known manner for repeated image measurement. That is, it is necessary that the azimuth angle from the reference axis of the projector can be calculated from the change pattern over time for any point measured by an imaging device.

Further, although the imaging part 34*b* that images the fringe pattern is a single unit in the present embodiment, a pair of imaging parts may be provided to acquire a stereo image.

That is, the shape measurement device 34 according to some embodiments is provided with the projection part 34*a* that is configured to project the pattern in which there is the luminance distribution in the build surface area 50 and the luminance distribution changes over time, and the imaging part 34*b* that is configured to image the pattern projected on the build surface area 50.

In the following description, a light beam of the pattern projected by the projection part 34*a* is also referred to as a first light beam 41, and a light beam from the pattern to be projected, that is, a light beam emitted from the build surface area 50 and imaged by the imaging part 34*b* is also referred to as a second light beam 42.

The undulation detection part 34*c* is an image analysis device capable of analyzing the image acquired by the imaging part 34*b* to evaluate the undulation in the build surface area 50, and is configured by, for example, a calculation processing device such as a computer. In the undulation detection part 34*c*, a two-dimensional image acquired from the imaging part 34*b* is converted into an independent three-dimensional coordinate system for each pixel based on an optical conversion equation to calculate an undulating shape in the build surface area 50.

The undulation detection part 34*c* may be configured as a part of the control device 100 of FIG. 1 or as a separate body.

Figure 4A:
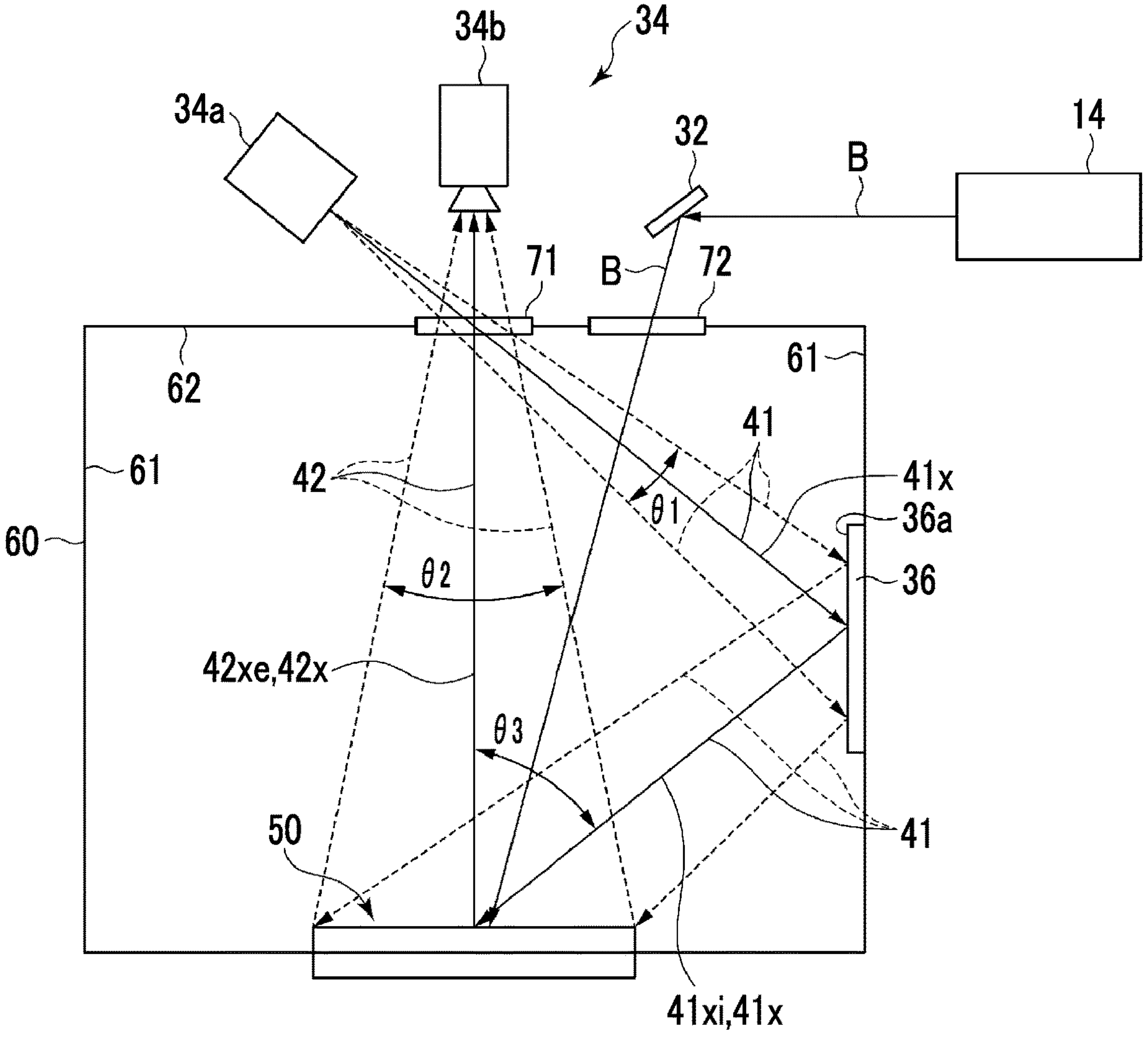
FIG. 4A is a schematic diagram showing a configuration example of the shape measurement device of FIG. 3 from a side.

FIG. 4A is a schematic diagram showing a configuration example of the shape measurement device 34 of FIG. 3 from a side.

Figure 4B:
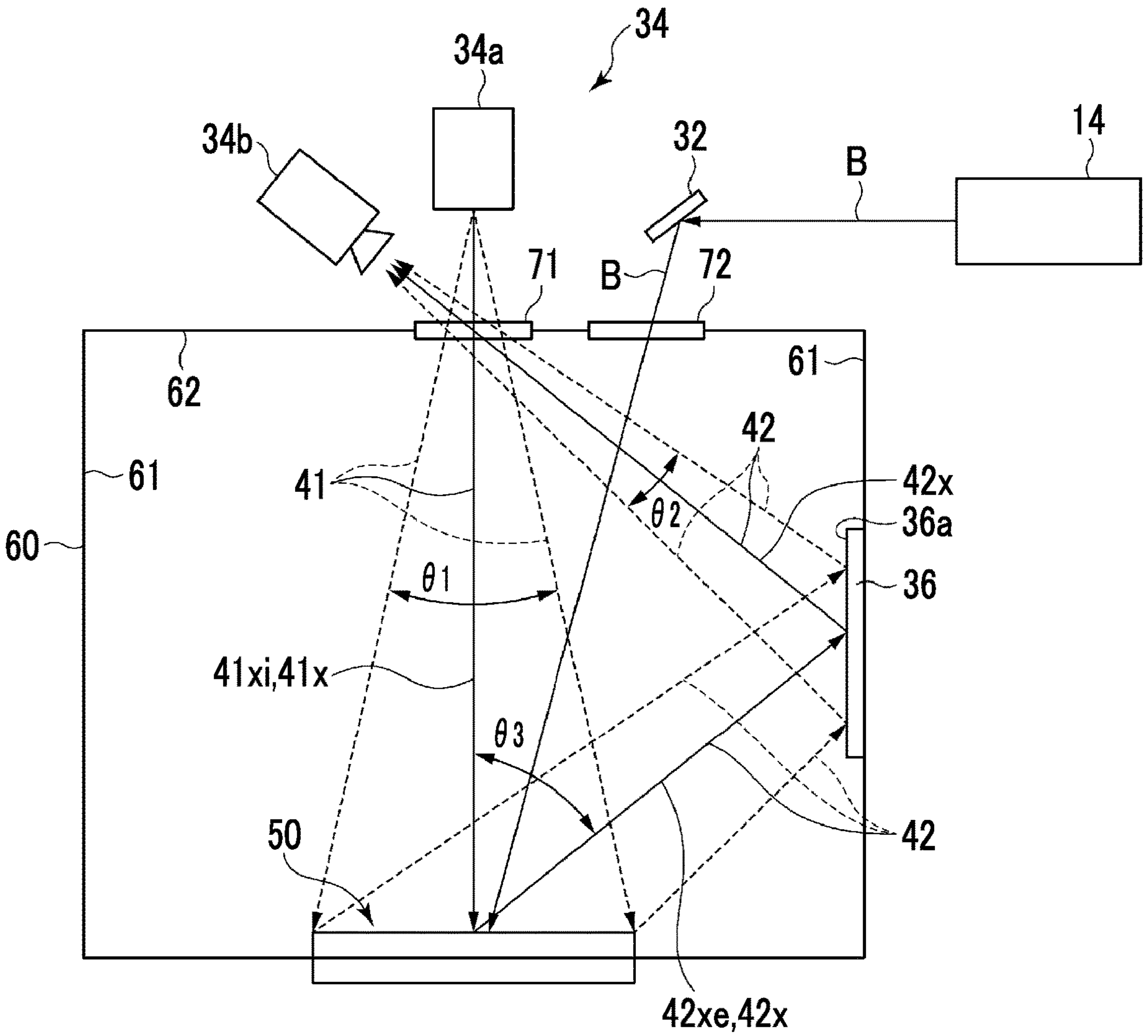
FIG. 4B is a schematic diagram showing another configuration example of the shape measurement device of FIG. 3 from the side.

FIG. 4B is a schematic diagram showing another configuration example of the shape measurement device 34 of FIG. 3 from the side.

Figure 4C:
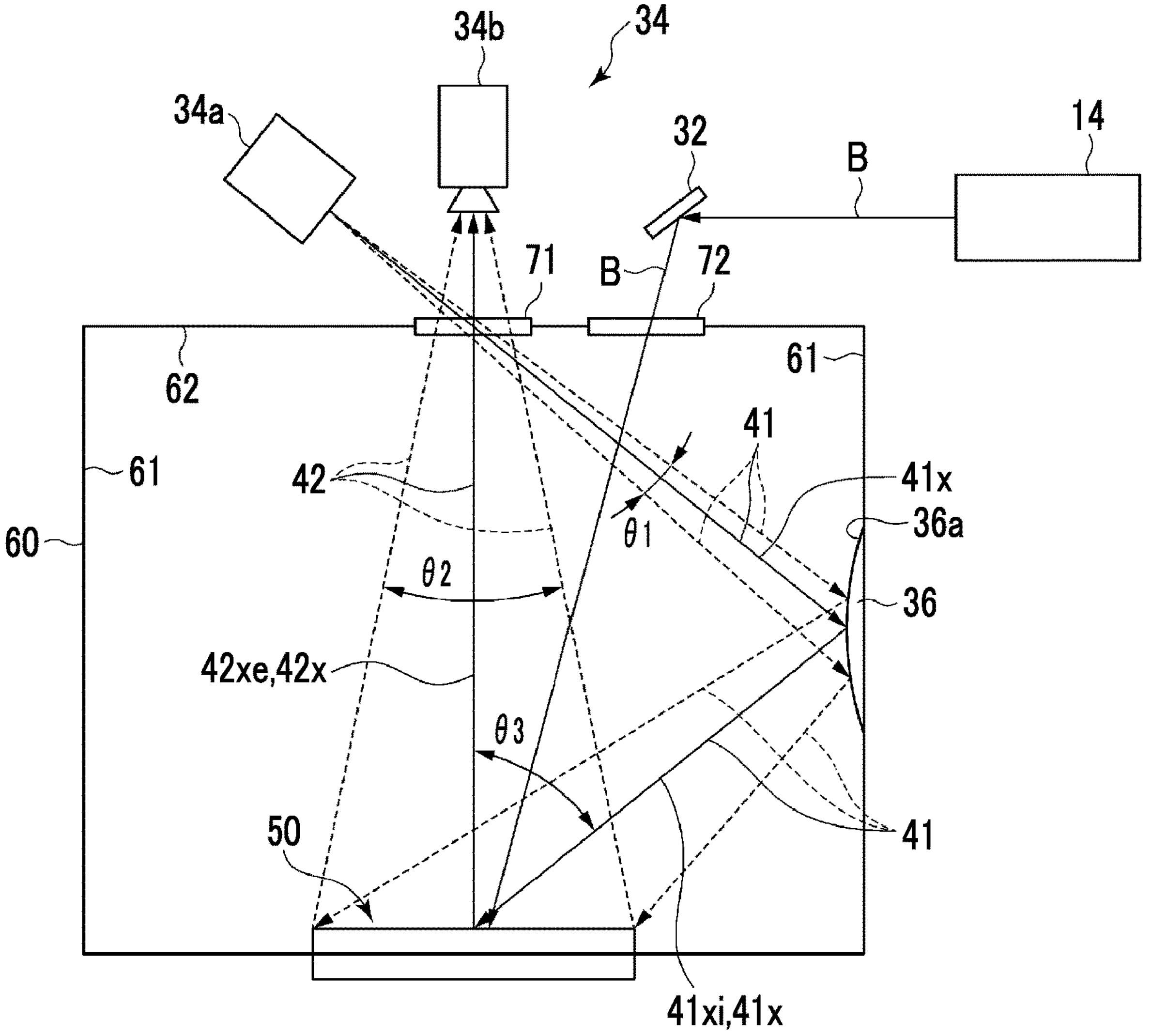
FIG. 4C is a schematic diagram showing further another configuration example of the shape measurement device of FIG. 3 from the side.

FIG. 4C is a schematic diagram showing another configuration example of the shape measurement device 34 of FIG. 3 from the side.

Figure 4D:
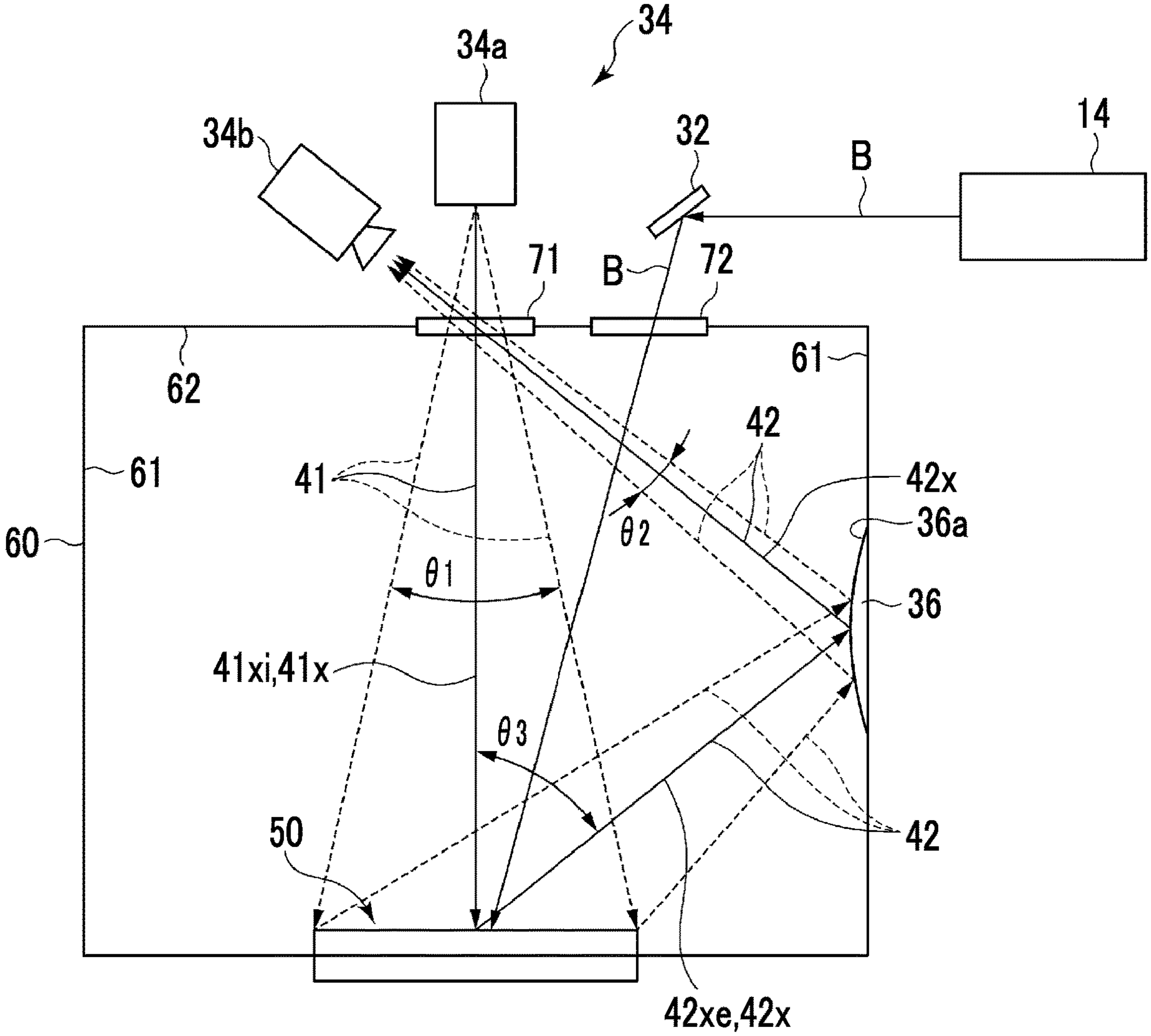
FIG. 4D is a schematic diagram showing further another configuration example of the shape measurement device of FIG. 3 from the side.

FIG. 4D is a schematic diagram showing another configuration example of the shape measurement device 34 of FIG. 3 from the side.

Figure 4E:
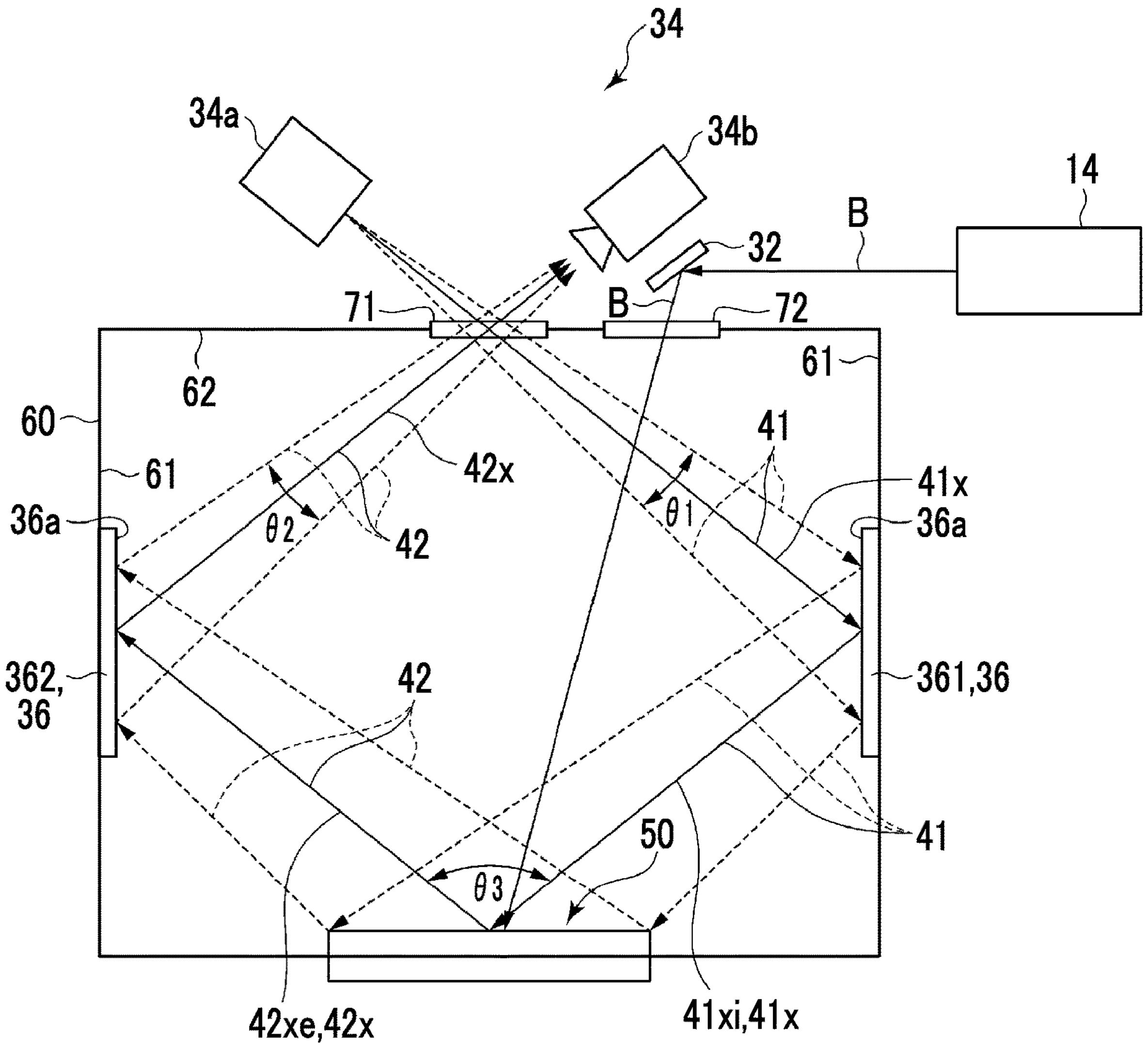
FIG. 4E is a schematic diagram showing further another configuration example of the shape measurement device of FIG. 3 from the side.

FIG. 4E is a schematic diagram showing another configuration example of the shape measurement device 34 of FIG. 3 from the side.

Figure 4F:
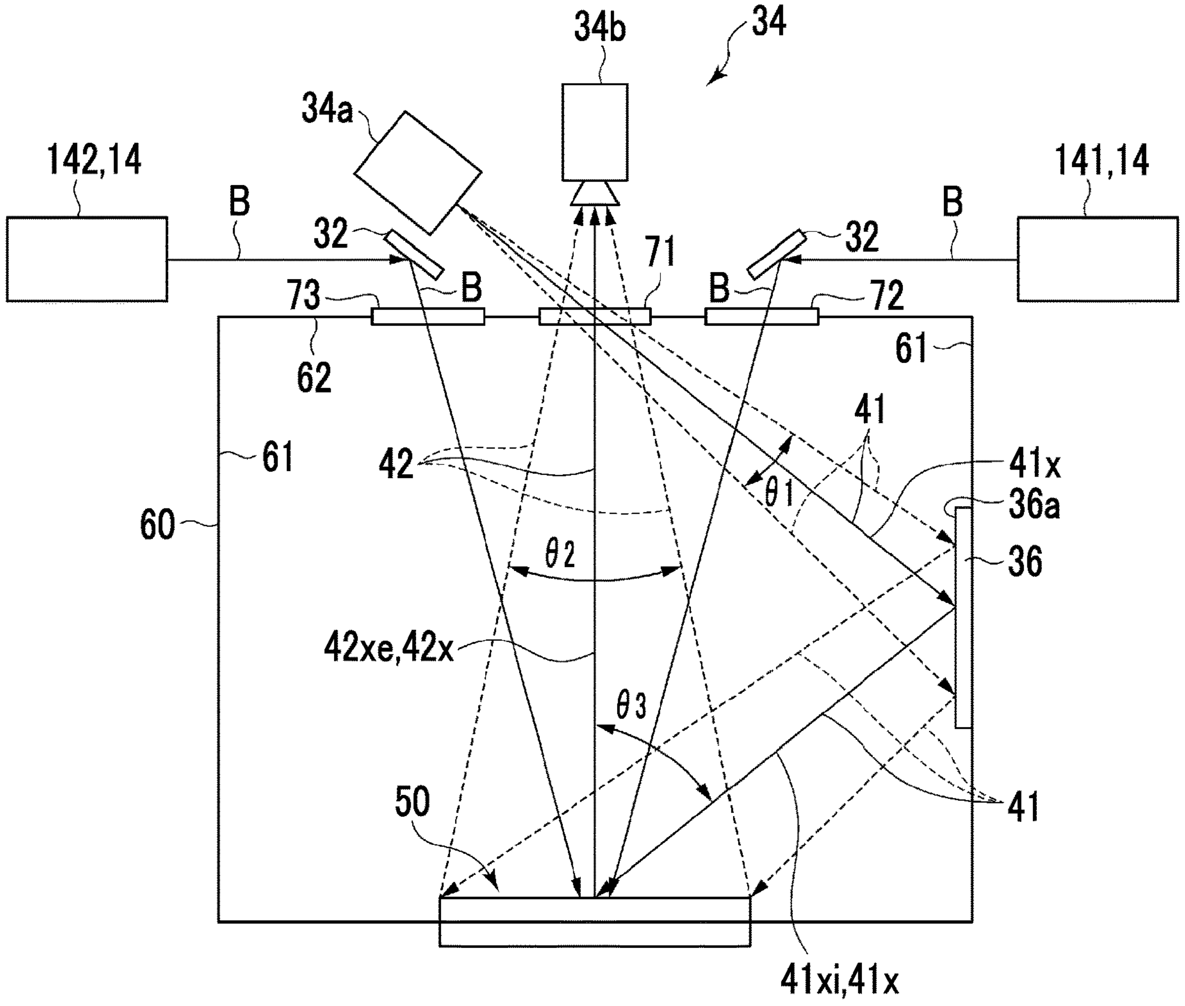
FIG. 4F is a schematic diagram showing further another configuration example of the shape measurement device of FIG. 3 from the side.

FIG. 4F is a schematic diagram showing another configuration example of the shape measurement device 34 of FIG. 3 from the side.

Figure 4G:
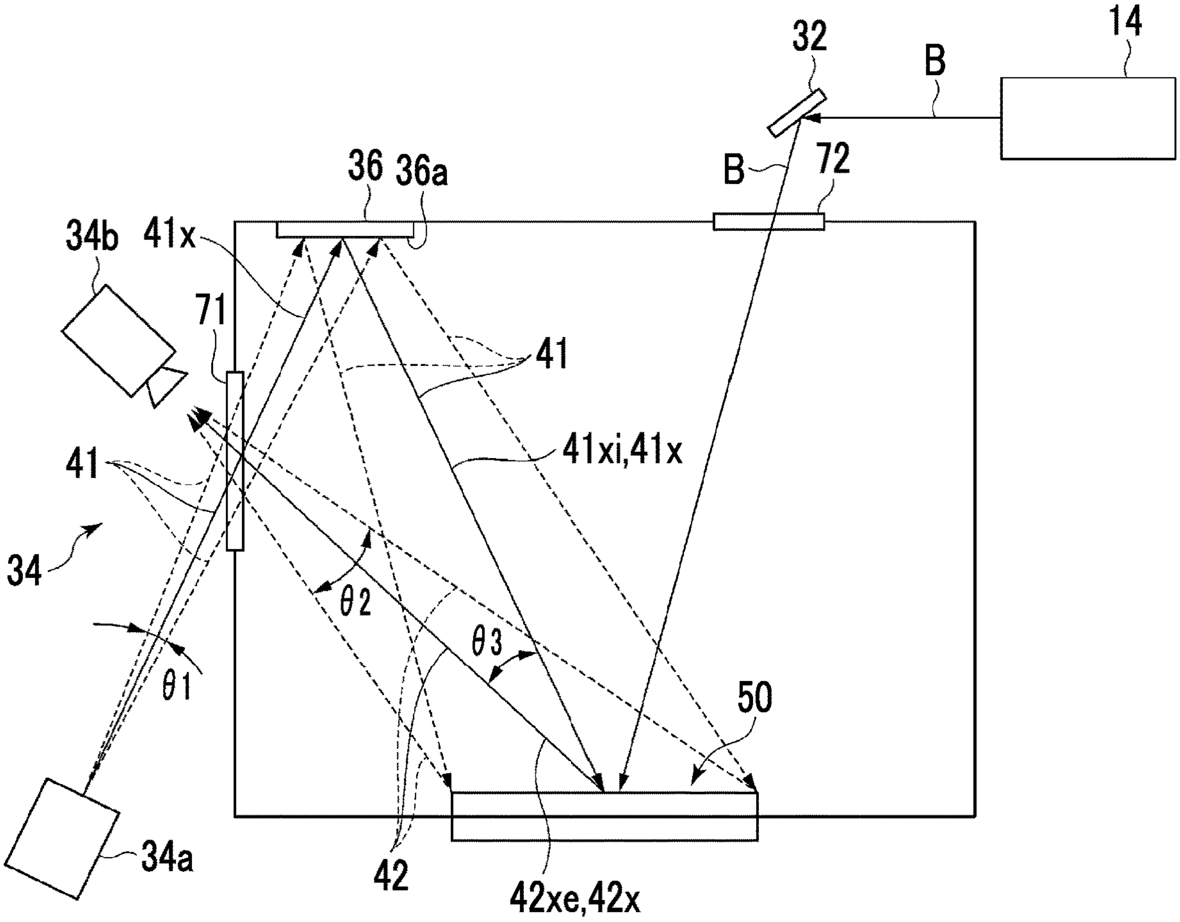
FIG. 4G is a schematic diagram showing further another configuration example of the shape measurement device of FIG. 3 from the side.

FIG. 4G is a schematic diagram showing another configuration example of the shape measurement device 34 of FIG. 3 from the side.

In the embodiments shown in FIGS. 4A to 4G, the shape measurement device 34 is provided with a reflective part 36 configured to reflect at least any one of the first light beam 41 projected by the projection part 34*a* or the second light beam 42 captured by the imaging part 34*b*, in addition to the projection part 34*a*, the imaging part 34*b*, and the undulation detection part 34*c*.

In the embodiments shown in FIGS. 4A to 4G, the reflective part 36 has a reflective surface 36*a* for reflecting the light beam. As will be described below, in some embodiments, the reflective surface 36*a* is a flat surface or a curved surface. That is, in the embodiments shown in FIGS. 4A to 4G, the reflective part 36 is a mirror.

In the embodiments shown in FIGS. 4A to 4G, the projection part 34*a* and the imaging part 34*b* of the shape measurement device 34 are disposed outside a chamber 60 in which the additive manufacturing is performed on the build surface area 50.

In the embodiments shown in FIGS. 4A to 4G, the reflective part 36 is accommodated in the chamber 60.

In the embodiments shown in FIGS. 4A to 4G, the first light beam 41 and the second light beam 42 can pass through one first window portion 71 installed in the chamber. A protective glass or the like is disposed in the first window portion 71 such that the first light beam 41 and the second light beam 42 can pass through while maintaining airtightness between the inside and the outside of the chamber 60.

In the embodiments shown in FIGS. 4A to 4F, the first window portion 71 is provided on an upper portion (ceiling portion 62) of the chamber 60.

In the embodiment shown in FIG. 4G, the first window portion 71 is provided on a side portion (side wall 61) of the chamber 60.

In the embodiments shown in FIGS. 4A to 4G, the beam B from the beam irradiation unit 14 is introduced into the chamber 60 via a second window portion 72 provided on the upper portion (ceiling portion 62) of the chamber 60 to be guided to the build surface area 50 provided on a bottom portion of the chamber 60. In the embodiment shown in FIG. 4F, two beam irradiation units 14 are provided. In the embodiment shown in FIG. 4F, the beam B from one beam irradiation unit 14 is introduced via the second window portion 72, and the beam B from the other beam irradiation unit 14 is introduced via a third window portion 73 provided on the upper portion (ceiling portion 62) of the chamber 60. The beams B are guided to the build surface area 50 provided on the bottom portion of the chamber 60.

The beam B from the beam irradiation unit 14 is two-dimensionally scanned on the build surface area 50 according to the angle of the galvanometer mirror 32.

A protective glass or the like is disposed in the second window portion 72 such that the beam B from the beam irradiation unit 14 can pass through while maintaining airtightness between the inside and the outside of the chamber 60.

In the embodiments shown in FIGS. 4A, 4C, 4E, 4F, and 4G, the reflective part 36 is configured to reflect the first light beam.

In the embodiments shown in FIGS. 4A, 4C, 4F, and 4G, the reflective part 36 is configured to reflect the first light beam 41 without reflecting the second light beam 42.

In the embodiments shown in FIGS. 4B, 4D, and 4E, the reflective part 36 is configured to reflect the second light beam.

In the embodiments shown in FIGS. 4B and 4D, the reflective part 36 is configured to reflect the second light beam 42 without reflecting the first light beam 41.

In the embodiment shown in FIG. 4E, the reflective part 36 includes a first reflective part 361 configured to reflect the first light beam 41 and a second reflective part 362, which is different from the first reflective part 361, configured to reflect the second light beam 42.

In the embodiments shown in FIGS. 4A, 4B, 4E, 4F, and 4G, the reflective part 36 includes the reflective surface 36*a* that is the flat surface. That is, in the embodiments shown in FIGS. 4A, 4B, 4E, 4F, and 4G, the reflective part 36 is a planar mirror.

In the embodiments shown in FIGS. 4C and 4D, the reflective part 36 includes the reflective surface 36*a* that is the curved surface. That is, in the embodiments shown in FIGS. 4C and 4D, the reflective part 36 is a curved mirror.

In the embodiment shown in FIG. 4C, in a case where an irradiation angle θ1 of the first light beam 41 from the projection part 34*a* can be reduced as compared with a case where the reflective surface 36*a* is the flat surface, the reflective surface 36*a* of the reflective part 36 may be a projected curved surface or a recessed curved surface. Alternatively, a combination of an equivalent optical element having a refractive power and a reflecting mirror may be used.

Further, in the embodiment shown in FIG. 4D, in a case where an angle of view θ2 of the imaging part 34*b* required to image the pattern projected on the build surface area 50 can be reduced as compared with a case where the reflective surface 36*a* is the flat surface, the reflective surface 36*a* of the reflective part 36 may be the projected curved surface or the recessed curved surface. Alternatively, a combination of a transmissive optical element having a refractive power and a reflecting mirror may be used.

In the embodiments shown in FIGS. 4A to 4F, the projection part 34*a* and the imaging part 34*b* are disposed above the chamber 60. In the embodiments shown in FIGS. 4A to 4F, the first light beam 41 and the second light beam 42 can pass through the first window portion 71 installed on the upper portion (ceiling portion 62) of the chamber 60. In the embodiments shown in FIGS. 4A to 4F, the reflective part 36 is attached to the side portion (side wall 61) of the chamber 60.

In the embodiment shown in FIG. 4G, the projection part 34*a* and the imaging part 34*b* may be disposed on the side of the chamber 60. In the embodiment shown in FIG. 4G, the first light beam 41 and the second light beam 42 can pass through the first window portion 71 installed on the side portion (side wall 61) of the chamber 60. In the embodiment shown in FIG. 4G, the reflective part 36 is attached to the ceiling portion 62 of the chamber 60.

In the embodiments shown in FIGS. 4A to 4E and 4G, there is only one beam irradiation unit (irradiation part) 14.

In the embodiment shown in FIG. 4F, a first beam irradiation unit (first irradiation part) 141 capable of emitting the beam B, which is a beam irradiation unit disposed outside the chamber 60, and a second beam irradiation unit (second irradiation part) 142 capable of emitting the beam B, which is a beam irradiation unit disposed outside the chamber 60 and is different from the first beam irradiation unit 141, are provided.

In the embodiment shown in FIG. 4F, the beam B emitted from the first beam irradiation unit 141 can pass through the second window portion 72, which is installed in the chamber 60 and is different from the first window portion 71. The beam B emitted from the second beam irradiation unit 142 can pass through the third window portion 73, which is installed in the chamber 60 and is different from the first window portion 71 and the second window portion 72.

In the embodiment shown in FIG. 4F, as described above, the second window portion 72 and the third window portion 73 are provided on the upper portion (ceiling portion 62) of the chamber 60.

(Problems in Three-Dimensional Additive Manufacturing Device in Related Art)

In a case where the undulation in the build surface area 50 is detected based on the image data acquired by the imaging part 34*b*, detection accuracy of the undulation in the build surface area 50 is lowered in a case where an angle θ3 formed by an optical axis (incident optical axis) 41*xi* of the first light beam 41 incident on the build surface area 50, in an optical axis 41*x* of the first light beam 41, and an optical axis (emission optical axis) 42*xe* of the second light beam 42 emitted from the build surface area 50, in an optical axis 42*x* of the second light beam 42, is relatively small. Therefore, the angle θ3 may be relatively large. For the above purpose, it is conceivable that a window portion for causing the first light beam 41 to be incident inside the chamber 60 and a window portion for causing the second light beam 42 to be emitted outside the chamber 60 are separately provided and a distance between the two windows is increased. Alternatively, it is conceivable that the incidence and emission of the first light beam 41 and the second light beam 42 are performed through one window portion having a relatively large opening area.

However, in a recent three-dimensional additive manufacturing device, for example, as shown in FIG. 4F, in order to shorten a manufacturing time, a plurality of beam irradiation units may be provided and the beam B may be emitted from each beam irradiation unit. In such a case, different window portions are provided on the ceiling portion 62 of the chamber 60 for each beam irradiation unit, and the beam from each beam irradiation unit is emitted via each of the window portions. Thus, it is difficult in terms of space to separately provide the window for the incidence of the first light beam 41 and the window for the emission of the second light beam 42 on the ceiling portion 62 of the chamber 60, or to provide the one window portion having a relatively large opening area.

(Solving Problems in Three-Dimensional Additive Manufacturing Device in Related Art)

(Regarding Present Disclosure in General)

According to the embodiments shown in FIGS. 4A to 4G, since at least any one of the first light beam 41 or the second light beam 42 is configured to be reflected by the reflective part 36, the angle θ3 can be increased as compared with a case where the reflective part 36 is not provided. Accordingly, it is possible to ensure the detection accuracy of the undulation in the build surface area 50.

Further, according to the embodiments shown in FIGS. 4A to 4G, since the angle θ3 can be increased, it is possible to ensure the detection accuracy of the undulation equal to or higher than that in a case where the window for the incidence of the first light beam 41 and the window for the emission of the second light beam 42 are separately provided or in a case where the one window portion having a relatively large opening area is provided.

According to the embodiments shown in FIGS. 4A to 4G, since only the first window portion 71 is required as the window portion for passing the first light beam 41 and the second light beam 42, it is easy to ensure the window portion even in a case where there is a space limitation.

Further, according to the embodiments shown in FIGS. 4A to 4G, since the opening area of the first window portion 71 can be made relatively small, it is easy to ensure the first window portion 71 even in a case where there is a space limitation.

A range where the light beam passes through the first window portion 71 is limited by a size of the first window portion 71 in a width direction and a size of the first window portion 71 in a thickness direction. According to the embodiments shown in FIGS. 4A to 4G, it is possible to mitigate the influence of the limitation.

Further, there is a limitation on the disposition position of the first window portion 71, and there is also a limitation on the disposition position of the projection part 34*a* or the imaging part 34*b*. Thus, a positional relationship between the first window portion 71 and the projection part 34*a* or the imaging part 34*b* is also limited. According to the embodiments shown in FIGS. 4A to 4G, it is possible to mitigate the influence of the limitation of the positional relationship.

According to the embodiments shown in FIGS. 4A to 4G, since the projection part 34*a* and the imaging part 34*b* are disposed outside the chamber 60, a space inside the chamber 60 can be ensured and a flow of an airflow such as the inert gas, which is introduced into the chamber 60 for ensuring the manufacturing quality, is less likely to be disturbed.

In the embodiments shown in FIGS. 4A, 4C, 4E, 4F, and 4G, the reflective part 36 is configured to reflect the first light beam.

Further, in the embodiments shown in FIGS. 4A, 4C, 4F, and 4G, the reflective part 36 is configured to reflect the first light beam 41 without reflecting the second light beam 42.

In this manner, in a case where the reflective part 36 is configured to reflect the first light beam 41, it is possible to lengthen a light path of the first light beam 41 as compared with a case where the first light beam 41 from the projection part 34*a* is directly emitted to the build surface area 50 and to reduce the irradiation angle θ1 of the first light beam 41 from the projection part 34*a*. Accordingly, it is possible to suppress distortion of a peripheral portion of the pattern in the pattern projected on the build surface area 50. Therefore, it is possible to improve the detection accuracy of the undulation of a region corresponding to the peripheral portion of the pattern in the build surface area 50. Further, since the irradiation angle θ1 of the first light beam 41 from the projection part 34*a* can be reduced, it is easy to reduce the size (opening area) of the first window portion 71.

In the embodiments shown in FIGS. 4B, 4D, and 4E, the reflective part 36 is configured to reflect the second light beam.

In the embodiments shown in FIGS. 4B and 4D, the reflective part 36 is configured to reflect the second light beam 42 without reflecting the first light beam 41.

In this manner, in a case where the reflective part 36 is configured to reflect the second light beam 42, it is possible to lengthen a light path of the second light beam 42 as compared with a case where the second light beam 42 emitted from the build surface area 50 is directly incident on the imaging part 34*b* and to reduce the angle of view θ2 of the imaging part 34*b* required for imaging the pattern projected on the build surface area 50. Accordingly, it is possible to suppress distortion of a peripheral portion of the image in the image of the pattern captured by the imaging part 34*b*. Therefore, it is possible to improve the detection accuracy of the undulation of the region corresponding to the peripheral portion of the pattern in the build surface area 50. Further, since the angle of view θ2 of the imaging part 34*b* required to image the pattern projected on the build surface area 50 can be reduced, it is easy to reduce the size (opening area) of the first window portion 71.

In the embodiment shown in FIG. 4E, the reflective part 36 includes a first reflective part 361 configured to reflect the first light beam 41 and a second reflective part 362, which is different from the first reflective part 361, configured to reflect the second light beam 42.

Accordingly, the first reflective part 361 is caused to reflect the first light beam 41, and thus, as described above, it is possible to improve the detection accuracy of the undulation of the region corresponding to the peripheral portion of the pattern in the build surface area 50. Further, the second reflective part 362 is caused to reflect the second light beam 42, and thus, as described above, it is possible to improve the detection accuracy of the undulation of the region corresponding to the peripheral portion of the pattern in the build surface area 50. That is, in the embodiment shown in FIG. 4E, it is possible to further improve the detection accuracy of the undulation of the region corresponding to the peripheral portion of the pattern.

In the embodiments shown in FIGS. 4A, 4B, 4E, 4F, and 4G, the reflective part 36 includes the reflective surface 36*a* that is the flat surface. That is, in the embodiments shown in FIGS. 4A, 4B, 4E, 4F, and 4G, the reflective part 36 is a planar mirror.

Accordingly, in the calculation for detecting the undulation in the build surface area 50 based on the image data acquired by the imaging part 34*b*, correction required due to the presence of the reflective part 36 is relatively simple as compared with the case where the reflective surface 36*a* is not the flat surface.

Further, in the embodiments shown in FIGS. 4A, 4B, 4E, 4F, and 4G, it is possible to suppress costs of the reflective part 36 as compared with a case where the reflective surface 36*a* is not the flat surface.

In the embodiments shown in FIGS. 4C and 4D, the reflective part 36 includes the reflective surface 36*a* that is the curved surface. That is, in the embodiments shown in FIGS. 4C and 4D, the reflective part 36 is the curved mirror.

In a case where the reflective part 36 is configured to reflect the first light beam 41 as in the embodiment shown in FIG. 4C, it is possible to reduce the irradiation angle θ1 of the first light beam 41 from the projection part 34*a* as compared with a case where the reflective surface 36*a* is the flat surface. Accordingly, even in a case where the size of the first window portion 71 is small, it is possible to project the pattern over a relatively wide range in the build surface area 50. The same effect as that of the curved mirror can be replaced with a combination of a transmissive optical element having a refractive power and one or more reflecting mirrors.

Further, in a case where the reflective part 36 is configured to reflect the second light beam 42 as in the embodiment shown in FIG. 4D, it is possible to obtain the same effect as increasing an opening diameter of an optical system in the imaging part 34*b* as compared with a case where the reflective surface 36*a* is the flat surface. Accordingly, it is possible to suppress deterioration in optical resolution due to a diffraction limit in the optical system. Further, in a case where the reflective part 36 is configured to reflect the second light beam 42 as in the embodiment shown in FIG. 4D, the angle of view θ2 of the imaging part 34*b* required to image the pattern projected on the build surface area 50 can be reduced as compared with a case where the reflective surface 36*a* is the flat surface. Therefore, it is easy to reduce the size of the first window portion 71.

In the embodiments shown in FIGS. 4A to 4F, the projection part 34*a* and the imaging part 34*b* are disposed above the chamber 60. In the embodiments shown in FIGS. 4A to 4F, the first light beam 41 and the second light beam 42 can pass through the first window portion 71 installed on the upper portion (ceiling portion 62) of the chamber 60. In the embodiments shown in FIGS. 4A to 4F, the reflective part 36 is attached to the side portion (side wall 61) of the chamber 60.

Accordingly, since there are relatively few limitations on the disposition of the projection part 34*a*, the imaging part 34*b*, and the reflective part 36, it is possible to relatively easily dispose the projection part 34*a*, the imaging part 34*b*, and the reflective part 36.

In the embodiment shown in FIG. 4G, the projection part 34*a* and the imaging part 34*b* are disposed on the side of the chamber 60. In the embodiment shown in FIG. 4G, the first light beam 41 and the second light beam 42 may pass through the first window portion 71 installed on the side portion (side wall 61) of the chamber 60. In the embodiment shown in FIG. 4G, the reflective part 36 is attached to the ceiling portion 62 of the chamber 60.

Accordingly, even in a case where the projection part 34*a* or the imaging part 34*b* is difficult to be disposed above the chamber 60, it is possible to dispose the projection part 34*a* or the imaging part 34*b* on the side of the chamber 60. In this case, with the attachment of the reflective part 36 to the ceiling portion 62 of the chamber 60, it is possible to make relatively large the angle θ3 formed by the optical axis (incident optical axis) 41*xi* of the first light beam 41 incident on the build surface area 50 and the optical axis (emission optical axis) 42*xe* of the second light beam 42 emitted from the build surface area 50.

In the embodiment shown in FIG. 4F, the beam B emitted from the first beam irradiation unit 141 can pass through the second window portion 72, which is installed in the chamber 60 and is different from the first window portion 71. The beam B emitted from the second beam irradiation unit 142 can pass through the third window portion 73, which is installed in the chamber 60 and is different from the first window portion 71 and the second window portion 72.

In the three-dimensional additive manufacturing device 1 configured to shorten the manufacturing time with the irradiation of the beam B from the plurality of beam irradiation units 14 as in the embodiment shown in FIG. 4F, as the number of the beam irradiation units 14 increases, the number of window portions provided in the chamber 60 also increases. Therefore, the size or the installation position of the first window portion 71 is further limited.

In the embodiment shown in FIG. 4F, even in a case where the size or the installation position of the first window portion 71 is further limited, it is possible to increase the angle θ3 formed by the optical axis (incident optical axis) 41*xi* of the first light beam 41 incident on the build surface area 50 and the optical axis (emission optical axis) 42*xe* of the second light beam 42 emitted from the build surface area 50. Accordingly, it is possible to ensure the detection accuracy of the undulation in the build surface area 50.

Figure 5:
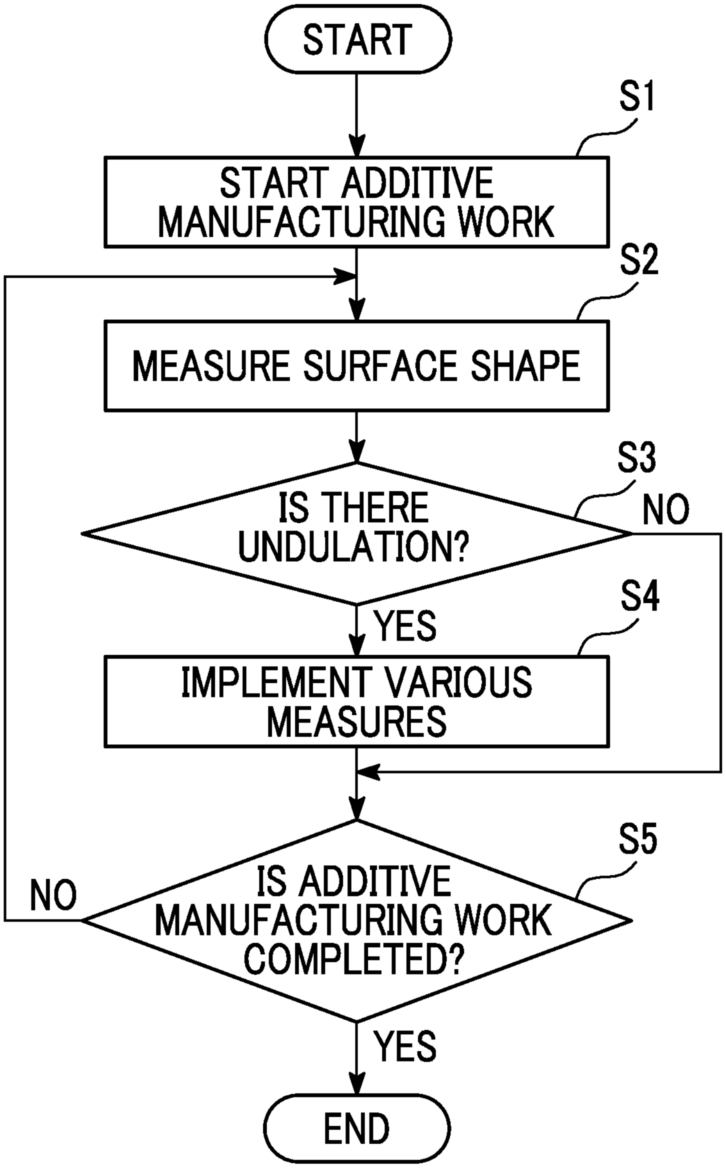
FIG. 5 is a flowchart showing, for each step, control contents of the three-dimensional additive manufacturing device according to some embodiments of the present disclosure.

Subsequently, a control example of the three-dimensional additive manufacturing device 1 having each of the above configurations will be described. FIG. 5 is a flowchart showing, for each step, control contents of the three-dimensional additive manufacturing device 1 according to some embodiments of the present disclosure.

First, the three-dimensional additive manufacturing device 1, more specifically, a CPU (not shown) of the control device 100 starts an additive manufacturing work (step S1). The additive manufacturing work proceeds with repeated implementation of a step of forming the powder bed 8 by the powder laying on the base plate 2 and a step of irradiating the powder bed 8 with the beam.

The three-dimensional additive manufacturing device 1 acquires a measurement result from the shape measurement device 34 during the additive manufacturing work to measure a surface shape of the build surface area 50 (step S2). In this case, in the shape measurement device 34, the surface shape of the build surface area 50 is measured as a three-dimensional structure by the measurement based on the fringe projection method as described above.

Subsequently, the three-dimensional additive manufacturing device 1 determines whether or not there is the undulation on the build surface area 50 based on the measurement result in step S2 (step S3). In the present embodiment, in a case where a detected undulation is out of an allowable range, determination is made that there is the undulation.

This allowable range is set, in a case where a manufacturing cycle progresses, based on whether or not the undulation is an unallowable abnormality for the product quality.

In a case where determination is made that there is the undulation in the build surface area 50 (step S3: YES), the three-dimensional additive manufacturing device 1 implements various measures for improving the product quality (step S4). The measures implemented here may be redoing of the laying work of the powder bed 8 by the powder laying unit 10 (recoater), a repair work such as beam re-irradiation on the build surface area 50, or notifying the operator of the presence of the undulation in the build surface area 50. Such undulation monitoring based on the surface shape is implemented until the additive manufacturing work is completed (step S5).

The monitoring of the build surface area 50 by the shape measurement device 34 may be performed on the powder bed 8 before the beam irradiation, or may be performed on the build surface after the beam irradiation is performed on the powder bed 8.

As described above, with the above-described three-dimensional additive manufacturing device 1, the shape measurement device 34 monitors the undulation on the build surface area 50 which is an abnormality or a sign thereof. In a case where the shape measurement device 34 detects the undulation having a size outside the allowable range, with implementation of appropriate improvement measures, it is possible to prevent, at an early stage, a fatal abnormality from occurring as the manufacturing work progresses.

The present disclosure is not limited to the embodiments described above and includes a form in which a modification is added to the embodiments described above or a form in which the above forms are combined as appropriate.

For example, in the embodiment shown in FIG. 4E, the reflective surface 36*a* may be included in which at least any one of the first reflective part 361 or the second reflective part 362 is the curved surface. That is, in the embodiment shown in FIG. 4E, at least any one of the first reflective part 361 or the second reflective part 362 may be the curved mirror.

The embodiment shown in FIG. 4F has the same configuration as the configuration in which one beam irradiation unit 14 is added to the embodiment shown in FIG. 4A. However, the embodiment shown in FIG. 4F may have the same configuration as the configuration in which two or more beam irradiation units 14 are added to the embodiment shown in FIG. 4A.

Further, one or more beam irradiation units 14 may be added to the embodiments shown in FIGS. 4B to 4E and 4G.

In the embodiment shown in FIG. 4G, the reflective part 36 is configured to reflect the first light beam 41, but the reflective part 36 may be configured to reflect the second light beam 42.

Further, in the embodiment shown in FIG. 4G, the reflective part 36 may include the reflective surface 36*a* having the curved surface. That is, in the embodiment shown in FIG. 4G, the reflective part 36 may be the curved mirror.

The contents described in each embodiment are understood as follows, for example.

(1) A three-dimensional additive manufacturing device 1 according to at least any one embodiment of the present disclosure is the three-dimensional additive manufacturing device 1 that irradiates a powder bed 8 laid in a build surface area 50 with a beam B to perform additive manufacturing, the three-dimensional additive manufacturing device 1 including a projection part 34*a* that is configured to project a pattern in which there is a luminance distribution in the build surface area 50 and the luminance distribution changes over time, an imaging part 34*b* that is configured to image the pattern projected on the build surface area 50, and a reflective part that is configured to reflect at least any one of a first light beam 41 projected by the projection part 34*a* or a second light beam 42 captured by the imaging part 34*b*. The projection part 34*a* and the imaging part 34*b* are disposed outside a chamber in which the additive manufacturing is performed on the build surface area. The reflective part 36 is accommodated in the chamber 60. The first light beam 41 and the second light beam 42 are able to pass through one first window portion 71 installed in the chamber 60.

With the configuration of (1) above, it is possible to increase an angle θ3 formed by an optical axis (incident optical axis) 41*xi* of the first light beam 41 incident on the build surface area 50, in an optical axis 41*x* of the first light beam 41, and an optical axis (emission optical axis) 42*xe* of the second light beam 42 emitted from the build surface area 50, in an optical axis 42*x* of the second light beam 42, as compared with a case where the reflective part 36 is not provided. Accordingly, it is possible to ensure the detection accuracy of the undulation in the build surface area 50.

Further, with the configuration (1), it is possible to ensure the detection accuracy of the undulation equal to or higher than that in a case where the window for the incidence of the first light beam 41 and the window for the emission of the second light beam 42 are separately provided or in a case where the one window portion having a relatively large opening area is provided.

With the configuration of (1) above, since only the first window portion 71 is required as the window portion for passing the first light beam 41 and the second light beam 42, it is easy to ensure the window portion even in a case where there is a space limitation.

Further, with the configuration (1), since the opening area of the first window portion 71 can be made relatively small, it is easy to ensure the first window portion 71 even in a case where there is a space limitation.

A range where the light beam passes through the first window portion 71 is limited by a size of the first window portion 71 in a width direction and a size of the first window portion 71 in a thickness direction. With the configuration of (1) above, it is possible to mitigate the influence of the limitation.

Further, there is a limitation on the disposition position of the first window portion 71, and there is also a limitation on the disposition position of the projection part 34*a* or the imaging part 34*b*. Thus, a positional relationship between the first window portion 71 and the projection part 34*a* or the imaging part 34*b* is also limited. With the configuration of (1) above, it is possible to mitigate the influence of the limitation of the positional relationship.

With the configuration of (1) above, since the projection part 34*a* and the imaging part 34*b* are disposed outside the chamber 60, a space inside the chamber 60 can be ensured and a flow of an airflow such as the inert gas, which is introduced into the chamber 60 for ensuring the manufacturing quality, is less likely to be disturbed.

With the configuration of (1) above, in a case where the reflective part 36 is configured to reflect the first light beam 41, it is possible to lengthen a light path of the first light beam 41 as compared with a case where the first light beam 41 from the projection part 34*a* is directly emitted to the build surface area 50 and to reduce the irradiation angle θ1 of the first light beam 41 from the projection part 34*a*.

Accordingly, it is possible to suppress distortion of a peripheral portion of the pattern in the pattern projected on the build surface area 50. Therefore, it is possible to improve the detection accuracy of the undulation of the region corresponding to the peripheral portion of the pattern in the build surface area 50. Further, since the irradiation angle θ1 of the first light beam 41 from the projection part 34*a* can be reduced, it is easy to reduce the size of the first window portion 71.

With the configuration of (1) above, in a case where the reflective part 36 is configured to reflect the second light beam 42, it is possible to lengthen a light path of the second light beam 42 as compared with a case where the second light beam 42 emitted from the build surface area 50 is directly incident on the imaging part 34*b* and to reduce the angle of view θ2 of the imaging part 34*b* required for imaging the pattern projected on the build surface area 50. Accordingly, it is possible to suppress distortion of a peripheral portion of the image in the image of the pattern captured by the imaging part 34*b*. Therefore, it is possible to improve the detection accuracy of the undulation of the region corresponding to the peripheral portion of the pattern in the build surface area 50. Further, since the angle of view θ2 of the imaging part 34*b* required to image the pattern projected on the build surface area 50 can be reduced, it is easy to reduce the size of the first window portion 71.

(2) In some embodiments, in the configuration of (1) above, the reflective part 36 may be configured to reflect the second light beam 42 without reflecting the first light beam 41.

With the configuration of (2) above, the reflective part 36 is caused to reflect the second light beam 42, and thus, as described above, it is possible to improve the detection accuracy of the undulation of the region corresponding to the peripheral portion of the pattern in the build surface area 50.

(3) In some embodiments, in the configuration of (1) above, the reflective part 36 may be configured to reflect the first light beam 41 without reflecting the second light beam 42.

With the configuration of (3) above, the reflective part 36 is caused to reflect the first light beam 41, and thus, as described above, it is possible to improve the detection accuracy of the undulation of the region corresponding to the peripheral portion of the pattern in the build surface area.

(4) In some embodiments, in the configuration of (1) above, the reflective part 36 may include a first reflective part 361 configured to reflect the first light beam 41, and a second reflective part 362, which is different from the first reflective part 361, configured to reflect the second light beam 42.

With the configuration (4) above, the first reflective part 361 is caused to reflect the first light beam 41, and thus, as described above, it is possible to improve the detection accuracy of the undulation of the region corresponding to the peripheral portion of the pattern in the build surface area 50. Further, with the configuration of (4) above, the second reflective part 362 is caused to reflect the second light beam 42, and thus, as described above, it is possible to improve the detection accuracy of the undulation of the region corresponding to the peripheral portion of the pattern in the build surface area 50. Therefore, with the configuration (4), it is possible to further improve the detection accuracy of the undulation of the region corresponding to the peripheral portion of the pattern.

(5) In some embodiments, in any one of the configurations (1) to (4) above, the reflective part 36 may include a reflective surface 36*a* that is a flat surface.

With the configuration of (5) above, in the calculation for detecting the undulation in the build surface area based on the image data acquired by the imaging part 34*b*, correction required due to the presence of the reflective part 36 is relatively simple as compared with the case where the reflective surface 36*a* is not the flat surface.

Further, with the configuration (5), it is possible to suppress costs of the reflective part 36 as compared with a case where the reflective surface 36*a* is not the flat surface.

(6) In some embodiments, in any one of the configurations (1) to (4) above, the reflective part 36 may include a reflective surface 36*a* that is a curved surface.

With the configuration (6) above, in a case where the reflective part 36 is configured to reflect the first light beam 41, it is possible to reduce the irradiation angle θ1 of the first light beam 41 from the projection part 34*a* as compared with a case where the reflective surface 36*a* is the flat surface. Accordingly, even in a case where the size of the first window portion 71 is small, it is possible to project the pattern over a relatively wide range in the build surface area 50.

Further, with the configuration (6), in a case where the reflective part 36 is configured to reflect the second light beam 42, it is possible to obtain the same effect as increasing an opening diameter of an optical system in the imaging part 34*b* as compared with a case where the reflective surface 36*a* is the flat surface. Accordingly, it is possible to suppress deterioration in optical resolution due to a diffraction limit in the optical system. Furthermore, with the configuration (6) above, in a case where the reflective part 36 is configured to reflect the second light beam 42, the angle of view θ2 of the imaging part 34*b* required to image the pattern projected on the build surface area 50 can be reduced as compared with a case where the reflective surface 36*a* is the flat surface. Therefore, it is easy to reduce the size of the first window portion 71.

(7) In some embodiments, in any one of the configurations (1) to (6) above, the projection part 34*a* and the imaging part 34*b* may be disposed above the chamber 60. The first light beam 41 and the second light beam 42 may be able to pass through the first window portion 71 installed on an upper portion of the chamber 60. The reflective part 36 may be attached to a side wall of the chamber 60.

With the configuration of (7) above, since there are relatively few limitations on the disposition of the projection part 34*a*, the imaging part 34*b*, and the reflective part 36, it is possible to relatively easily dispose the projection part 34*a*, the imaging part 34*b*, and the reflective part 36.

(8) In some embodiments, in any one of the configurations (1) to (6) above, the projection part 34*a* and the imaging part 34*b* may be disposed on a side of the chamber 60. The first light beam 41 and the second light beam 42 may be able to pass through the first window portion 71 installed on a side portion of the chamber 60. The reflective part 36 may be attached to a ceiling portion 62 of the chamber 60.

With the configuration (8) above, even in a case where the projection part 34*a* or the imaging part 34*b* is difficult to be disposed above the chamber 60, it is possible to dispose the projection part 34*a* or the imaging part 34*b* on the side of the chamber 60. In this case, with the attachment of the reflective part 36 to the ceiling portion 62 of the chamber 60, it is possible to make relatively large the angle θ3 formed by the optical axis (incident optical axis) 41*xi* of the first light beam 41 incident on the build surface area 50 and the optical axis (emission optical axis) 42*xe* of the second light beam 42 emitted from the build surface area 50.

(9) In some embodiments, in any one of the configurations (1) to (8) above, a first irradiation part (first beam irradiation unit 141) that is capable of emitting the beam B and is disposed outside the chamber 60, and a second irradiation part (second beam irradiation unit 142) that is capable of emitating the beam B and is disposed outside the chamber 60, which is different from the first irradiation part (first beam irradiation unit 141) may be further included. The beam B emitted from the first irradiation part (first beam irradiation unit 141) may be able to pass through a second window portion 72 installed in the chamber 60, which is different from the first window portion 71, and the beam B emitted from the second irradiation part (second beam irradiation unit 142) may be able to pass through a third window portion 73 installed in the chamber 60, which is different from the first window portion 71 and the second window portion 72.

In the three-dimensional additive manufacturing device 1 configured to shorten the manufacturing time with the emission of the beam B from the plurality of irradiation parts (beam irradiation units 14) as in the configuration of (9) above, as the number of the irradiation parts (beam irradiation units 14) increases, the number of window portions provided in the chamber 60 also increases. Therefore, the size or the installation position of the first window portion 71 is further limited.

With the configuration (9) above, even in a case where the size or the installation position of the first window portion 71 is further limited, it is possible to increase the angle θ3 formed by the optical axis (incident optical axis) 41*xi* of the first light beam 41 incident on the build surface area 50 and the optical axis (emission optical axis) 42*xe* of the second light beam 42 emitted from the build surface area 50. Accordingly, it is possible to ensure the detection accuracy of the undulation in the build surface area 50.

REFERENCE SIGNS LIST

1: three-dimensional additive manufacturing device
8: powder bed
14: beam irradiation unit (irradiation part)
34: shape measurement device
34*a*: projection part
34*b*: imaging part
34*c*: undulation detection part
36: reflective part
361: first reflective part
362: second reflective part
60: chamber
61: side wall (side portion)
62: ceiling portion (upper portion)
71: first window portion
72: second window portion
73: third window portion
100: control device
141: first beam irradiation unit (first irradiation part)
142: second beam irradiation unit (second irradiation part)

The invention claimed is:

1. A three-dimensional additive manufacturing device that irradiates a powder bed laid in a build surface area with a beam to perform additive manufacturing, the three-dimensional additive manufacturing device comprising:

a projection part that is configured to project a pattern in which there is a luminance distribution in the build surface area and the luminance distribution changes over time;

an imaging part that is configured to image the pattern projected on the build surface area; and a reflective part that is configured to reflect at least any one of a first light beam projected by the projection part or a second light beam captured by the imaging part, wherein the projection part and the imaging part are disposed outside a chamber in which the additive manufacturing is performed on the build surface area, the reflective part is attached to a side wall or a side portion of the chamber, the first light beam and the second light beam are able to pass through one first window portion installed in the chamber, and the reflective part includes a reflective surface that is a curved surface.

2. The three-dimensional additive manufacturing device according to claim 1, wherein the reflective part is configured to reflect the second light beam without reflecting the first light beam.

3. The three-dimensional additive manufacturing device according to claim 1, wherein the reflective part is configured to reflect the first light beam without reflecting the second light beam.

4. The three-dimensional additive manufacturing device according to claim 1, wherein the reflective part includes:

a first reflective part configured to reflect the first light beam; and a second reflective part, which is different from the first reflective part, configured to reflect the second light beam.

5. The three-dimensional additive manufacturing device according to claim 1, wherein the projection part and the imaging part are disposed above the chamber, the first light beam and the second light beam are able to pass through the first window portion installed on an upper portion of the chamber, and the reflective part is attached to a side wall of the chamber.

6. The three-dimensional additive manufacturing device according to claim 1, wherein the projection part and the imaging part are disposed on a side of the chamber, and the first light beam and the second light beam are able to pass through the first window portion installed on a side portion of the chamber.

7. The three-dimensional additive manufacturing device according to claim 1, further comprising:

a first irradiation part that is capable of emitting the beam and is disposed outside the chamber; and a second irradiation part that is capable of emitting the beam and is disposed outside the chamber, which is different from the first irradiation part, wherein the beam emitted from the first irradiation part is able to pass through a second window portion installed in the chamber, which is different from the first window portion, and the beam emitted from the second irradiation part is able to pass through a third window portion installed in the chamber, which is different from the first window portion and the second window portion.

8. A three-dimensional additive manufacturing device that irradiates a powder bed laid in a build surface area with a beam to perform additive manufacturing, the three-dimensional additive manufacturing device comprising:

a projection part that is configured to project a pattern in which there is a luminance distribution in the build surface area and the luminance distribution changes over time;

an imaging part that is configured to image the pattern projected on the build surface area; and a reflective part that is configured to reflect at least any one of a first light beam projected by the projection part or a second light beam captured by the imaging part, wherein the projection part and the imaging part are disposed outside a chamber in which the additive manufacturing is performed on the build surface area, the reflective part is accommodated in the chamber, the first light beam and the second light beam are able to pass through one first window portion installed in the chamber, the projection part and the imaging part are disposed above the chamber, the first light beam and the second light beam are able to pass through the first window portion installed on an upper portion of the chamber, and the reflective part is attached to a side wall of the chamber.

9. The three-dimensional additive manufacturing device according to claim 8, wherein the reflective part is configured to reflect the second light beam without reflecting the first light beam.

10. The three-dimensional additive manufacturing device according to claim 8, wherein the reflective part is configured to reflect the first light beam without reflecting the second light beam.

11. The three-dimensional additive manufacturing device according to claim 8, wherein the reflective part includes:

a first reflective part configured to reflect the first light beam; and a second reflective part, which is different from the first reflective part, configured to reflect the second light beam.

12. The three-dimensional additive manufacturing device according to claim 8, wherein the reflective part includes a reflective surface that is a flat surface.

13. The three-dimensional additive manufacturing device according to claim 8, wherein the reflective part includes a reflective surface that is a curved surface.

14. The three-dimensional additive manufacturing device according to claim 8, further comprising:

a first irradiation part that is capable of emitting the beam and is disposed outside the chamber; and a second irradiation part that is capable of emitting the beam and is disposed outside the chamber, which is different from the first irradiation part, wherein the beam emitted from the first irradiation part is able to pass through a second window portion installed in the chamber, which is different from the first window portion, and the beam emitted from the second irradiation part is able to pass through a third window portion installed in the chamber, which is different from the first window portion and the second window portion.

* * * * *